July 7, 1936.  C. H. HAVILL ET AL  2,046,453
AUTOMATIC TRANSMISSION
Filed June 29, 1932  2 Sheets-Sheet 2
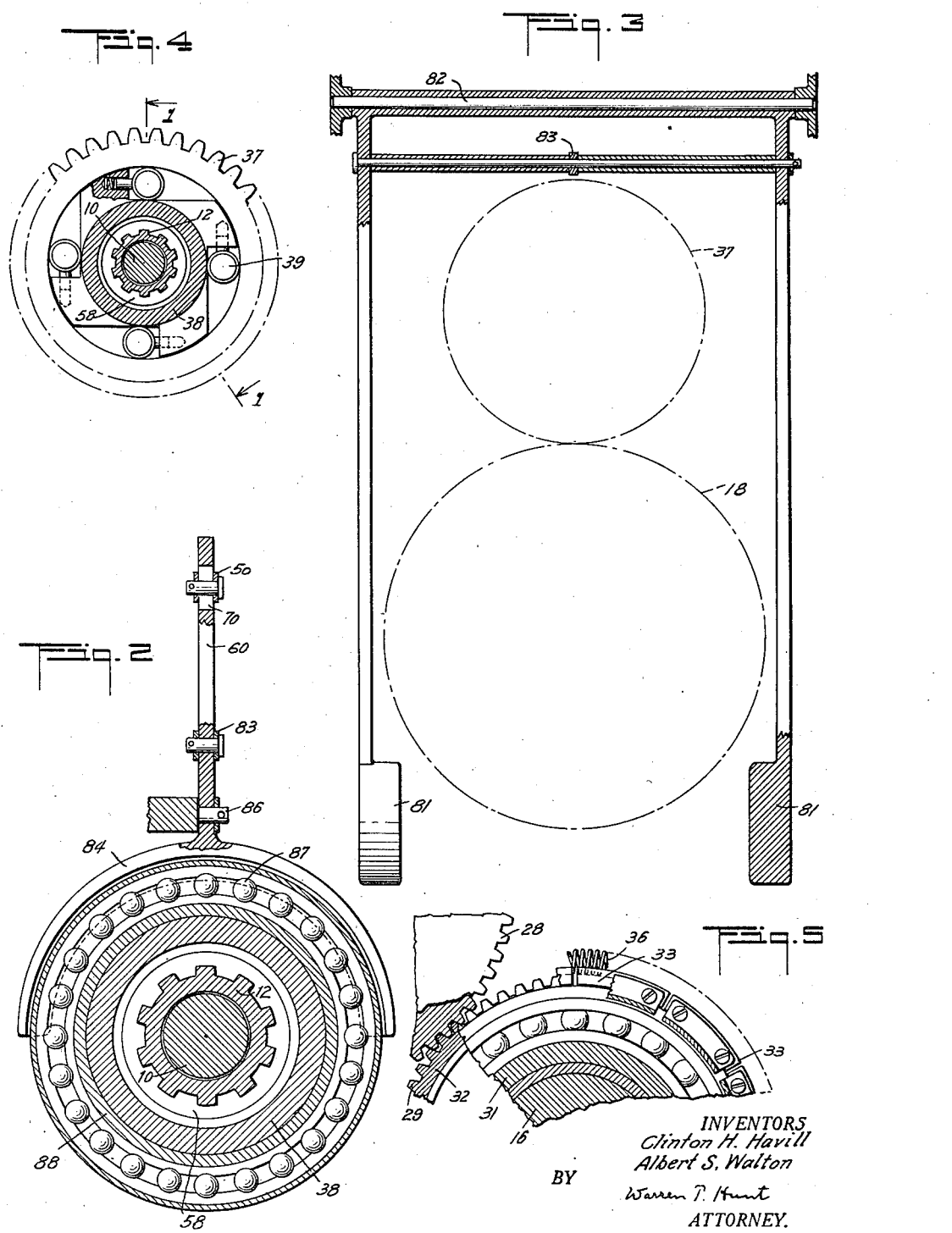
INVENTORS
Clinton H. Havill
Albert S. Walton
BY Warren P. Hunt
ATTORNEY.

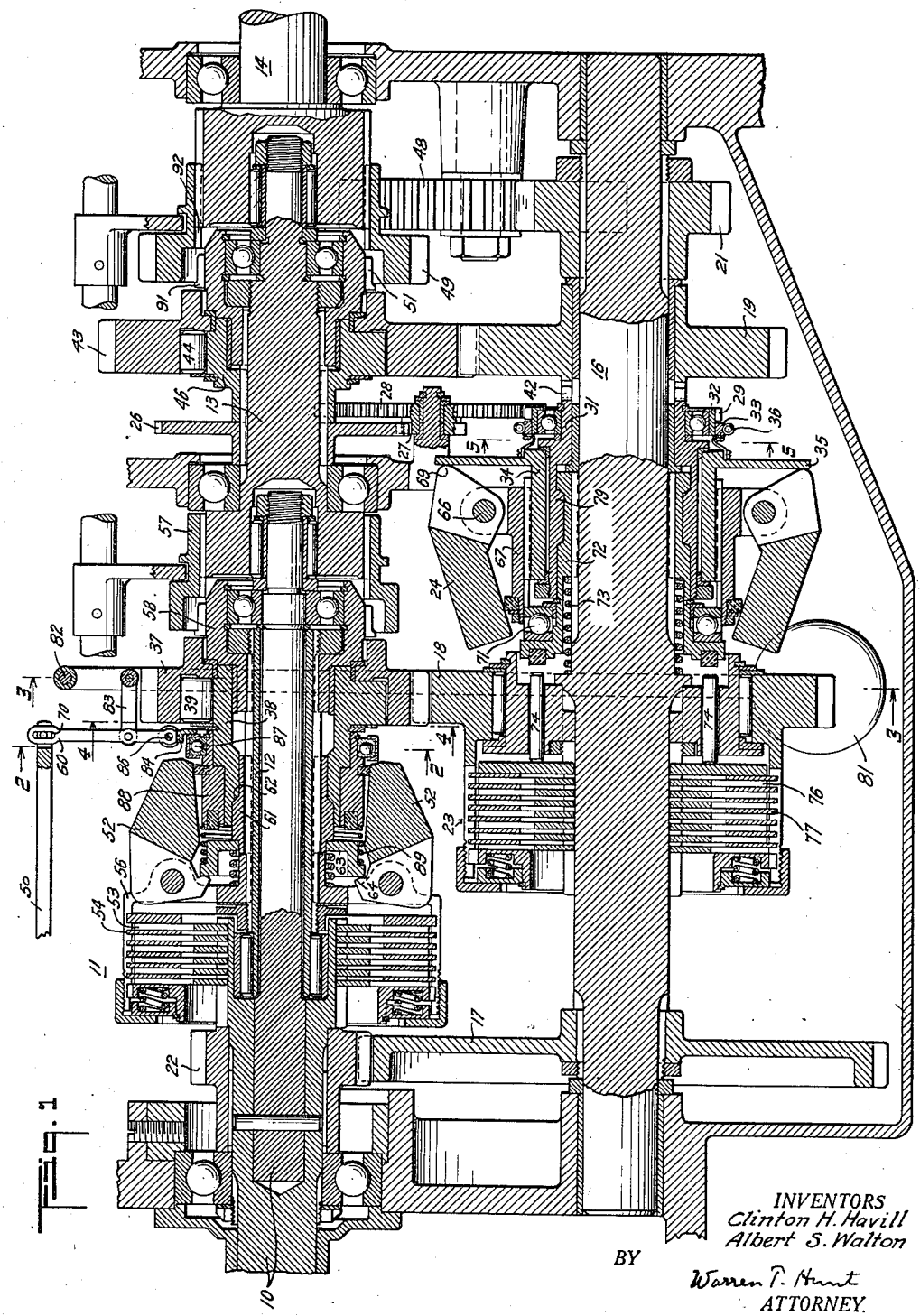

Patented July 7, 1936

2,046,453

UNITED STATES PATENT OFFICE 2,046,453

AUTOMATIC TRANSMISSION

Clinton H. Havill, South Orange, and Albert S. Walton, East Orange, N. J., assignors, by mesne assignments, to Eclipse Aviation Corporation, East Orange, N. J., a corporation of New Jersey Application June 29, 1932, Serial No. 619,996

24 Claims. (Cl. 74—336)

This invention relates to transmission mechanisms and more particularly to variable speed automatic transmissions.

The invention is shown as embodied in an automatic vehicle transmission and an object of the invention is to provide a transmission mechanism for a road vehicle in which the speed or gear changes are made in accordance with the load upon and speed of the driven shaft.

A feature of the invention relates to a novel control of the high speed gear friction clutch which preferably is responsive to speed and load and has its capacity varied by a swinging weight or pendulum, the arrangement in the embodiment shown being such that the tendency to change to a lower gear ratio is increased when the vehicle is ascending a hill.

Another feature of the invention relates to the second speed clutch which is responsive to the speed of the vehicle and has centrifugal means for operating the clutch, the centrifugal means being driven by a step-up gear train. Means are also provided for disengaging the driving means of the centrifugal control at high vehicle speeds.

A principal object of the invention is to provide an automatic variable speed transmission mechanism for a road vehicle in which the gear changes are responsive to the combined influence of load, speed and the grade of the road upon which the vehicle is used.

Another object of the invention is to provide a variable speed automatic transmission mechanism in which at least two speeds are responsive to the speed of and the load upon the driven shaft.

Other objects and features of the invention will be apparent from the foregoing description in connection with which a preferred embodiment of the invention has been illustrated in the accompanying drawings, in which:

Fig. 1 is a sectional elevational view showing a vehicle transmission illustrated in accordance with the invention;

Fig. 2 is a sectional view taken on line 2—2 of Fig. 1;

Fig. 3 is a sectional view taken on line 3—3 of Fig. 1 showing the arrangement of the pendulum clutch control;

Fig. 4 is a sectional view taken on the line 4—4 of Fig. 1 illustrating one of the overrunning clutches; and Fig. 5 is a fragmental sectional view taken on line 5—5 of Fig. 1 illustrating the centrifugal release mechanism of the drive for the second speed weights.

In automatic transmissions, it usually is desirable to vary the control features in a manner to cause the transmission to have a greater tendency to shift to a lower gear ratio when ascending a hill, and this condition is provided for in the present invention by the inclusion of the gravity actuated member or pendulum which is normally pivoted to the transmission housing and arranged to decrease the clutch capacity of the high speed gear when the transmission is inclined upwardly with respect to the horizontal.

Referring to the drawings, 10 is the driving shaft adapted to transmit motion through the friction clutch generally designated at 11 to the hollow driven shaft 12, connected to a second driven shaft 13 and which in turn is connected to the propeller shaft 14 from which power is transmitted to the driving wheels of a vehicle (not shown). A countershaft 16 is preferably placed adjacent the aligned driving and driven shafts which is provided with a series of gears 17, 18, 19, and 21. Gear 17 is secured to the countershaft and is permanently in mesh with gear 22 that is splined or otherwise secured to the driving shaft 10. Gear 18 is not directly secured to countershaft 16 but is adapted to be connected therewith by a friction clutch generally designated at 23 which is quite similar in construction to the high speed clutch 11, the engagement being made by weights 24 that are driven from the shaft 13 by a gear train including gear 26 having a splined connection with the shaft 13 and meshing with pinion 27 having an integral connection with gear 28, that in turn is meshed with gear 29 rotatably mounted upon sleeve 31. As best shown in Figs. 1 and 5, gear 29 has its hub portion 32 in frictional contact with shoes 33 spaced about the periphery of the hub and secured to the weight driving member 34, the disc portion 35 of which is in contact with the end portions of weights 24. A toroidal spring 36 normally holds shoes 33 against the hub portion of gear 32 but is preferably of such strength that at high velocity, the centrifugal force of shoes 33 forces them outwardly out of contact with the hub of gear 32 and limits the speed at which member 34 is driven.

Gear 18 consititutes one of the intermediate speed gears and is meshed with gear 37 having an overrunning clutch engagement with sleeve 38 by means of rollers 39 which are adapted to place the gear in driving connection with sleeve 38 when the shaft 12 has been disengaged from driving shaft 10, but to permit shaft 12 to overrun the gear 37 when the clutch 11 is engaged.

The transmission is shown in the at-rest position which so far as the clutches and centrifugal weights are concerned also corresponds to the low speed gear position.

The high speed drive from shaft 10 to propeller shaft 14 is by means of clutch 11, the driving plates 53 of which are splined to the driving shaft 10 and the driven plates of which are splined to the driven sleeve 12, the clutch being engaged when weights 52 are in their outermost position. The weights are pivotally mounted on clutch housing 56 and adapted to press the driving and driven plates into frictional engagement.

The second speed drive is obtained when the main clutch 11 is disengaged and the clutch 23 is in engaged position. The second speed can only be obtained during movement of the vehicle, for clutch 23 is engaged by outward movement of weights 24 which are driven from the shaft 13, and therefore will not engage the clutch 23 until the vehicle has been set in motion. Gear 37 is connected to driven sleeve 12 by a nut 61 splined to the sleeve and having a coarse threaded connection at 62 with hub 38. The arrangement of the threads is such that when hub 38 is driven by gear 37 through the overrunning clutch rollers 39, nut 61 is moved toward the left by the torque reaction and causes collar 63 to engage the weights and move them to their inner or inoperative position, shown in Fig. 1. Weights 24 are so selected that for all speeds of the driven shaft 12 above a predetermined minimum, clutch 23 is in driving engagement and gear 37 is driven from the countershaft 16, it being understood that gear 37 will drive the sleeve 12 at speeds below that at which clutch 11 is engaged and that rollers 39 will permit shaft 12 to overrun gear 37 when the clutch 11 is in engagement.

The low speed gear drive is obtained from the counter shaft gear 19 which is meshed with a gear 43 having its hub 46 splined to driven shaft 13, the outer portion being connected to the hub by an overrunning clutch including rollers 44. Gear 19 is connected to the counter shaft through sleeve 31 by a series of intermeshed teeth preferably having a slight clearance between their mating faces to permit a slight angular movement between sleeve 31 and gear 19. Sleeve 31 is drivably connected to counter shaft 16 through slidable sleeve 72 which is splined to the shaft 16 and has a coarse threaded connection with sleeve 31 at 79. Sleeve 72 is normally urged toward the right by spring 73, and the arrangement of the threaded connection is such as to cause the torque reaction between shaft 16 and gear 19 to assist spring 72 during the time that gear 19 is acting as a driving member. Gear 19 will become a driving member whenever the load upon clutch 23 is sufficient to cause slippage, and the clutch will be immediately disengaged by the combined action of the spring and threads to move sleeve 72 toward the right against the force of weights 24 which tend to engage the clutch.

The reverse gear train includes gear 21 having a splined connection with countershaft 16, the reverse idler gear 48 and gear 49 that is splined to shaft 14, and slidable thereon to connect shaft 14 with the coupler 51 in the normal forward driving position.

In the operation of the transmission, assuming that the vehicle is traveling upon a level road and under conditions that will permit the use of the high gear, clutch 11 will be engaged by outward movement of weights 52 which press the driving and driven friction discs 53 and 54 into contact and directly connect shafts 10 and 12, it being understood that clutch housing 56 is secured to the shaft 12. Slidable coupling 57 and gear 49 should be moved to the left, as shown in Fig. 1, whereby shaft 13 is connected with shaft 12 through member 58 and motion will be transmitted from shaft 13 through hub 51 and gear 49 to the driven shaft 14.

If for any reason the vehicle should encounter a road resistance sufficiently high to cause a gear change, threaded nut 61 will move toward the left by reason of the coacting threads 62 and cause collar 63 to engage projection 64 of the weights 52 and force them to their inner positions, (as in Fig. 1), whereby clutch 11 is disengaged. Upon disengagement of clutch 11, the drive will be taken up by the second speed gear train including the gears 22, 17, 18, and 37. Gear 18 has been previously clutched to the countershaft 16 by outward movement of the weights 24 which are pivotally mounted at 66 upon drum 67 which is splined to the hub portion of member 34 and which, as before mentioned, is driven at high speed by the shaft 13 through gears 26, 27, 28, and 29. Outward movement of weights 24 causes the cam nose 69 to engage the disc 35 and force the drum 67 towards the left against thrust bearing 71 and move sleeve 72 against the action of spring 73 into contact with pin 74. Movement of pin 74 toward the left forces the driving and driven plates 76 and 77 respectively into frictional contact with each other and clutches gear 18 to the countershaft 16.

If the load on the vehicle should be still further increased, the speed of weights 24 will be slowed sufficiently to enabe springs 73 to force sleeve 72 toward the right, which action is assisted by the coacting threaded portion 79, to release clutch 23 and permit the low speed gear train to assume the load, whereby the drive will be through gears 22, 17, 19, and 43 to the driven shaft 14.

The upward gear changes will be automatically determined in the reverse direction by a decrease in load on the driven shaft. Weights 24 are responsive to driven shaft speed and when the load decreases the engine will increase the speed of the vehicle. At some predetermined speed weights 24 will exert sufficient centrifugal force to overcome the spring 73 and the axial force due to torque reaction whereupon sleeve 72 will be moved toward the left to engage clutch 23 and cause the vehicle to be driven in the second speed gear.

Weights 52 are also responsive to driven shaft speed and if the load is decreased still further, they will overcome the axial force upon nut 61 produced by torque reaction and enable them to move to their outermost position wherein the clutch 11 is engaged and the driving shaft is directly connected to the driven shaft. It may be noted that when the load is removed from the second speed gear during operation of the low speed gear that weights 52 may move toward their outer position without opposition by torque reaction, but it will be realized that under this condition the speed is low and the weights are so selected as to prevent a driving engagement of clutch 11 during operation in the low speed gear.

The above action is automatic and will occur at the same predetermined speeds so long as the vehicle is traveling upon a level road, but if the vehicle should be ascending a grade, pendulum weight 81 that is pivoted about shaft 82 will act to increase the tendency to change to second gear as the transmission as a whole is inclined upwardly with respect to the horizontal. Upward inclination of the vehicle will cause weight 81 to swing about its pivotal axis 82 in a counter-clockwise direction, as viewed in Fig. 1, which by means of linkage 83 will rock yoke 84 in a clockwise direction about its pivotal axis 86 into contact with thrust bearing 87 and move sleeve 88 toward the left, as viewed in Fig. 1, whereby spring 89 is compressed and urges collar 63 against nose 64 of the weights 52 and counteracts a portion of their outward force. It may readily be seen that such action will cause clutch 11 to release at a lower speed while ascending a hill, and that a change to second speed gear will be made at a lower vehicle speed than would occur on a level road. If the vehicle is proceeding on an upward grade the clutch capacity will also be varied upon acceleration and deceleration of the vehicle. This operation of the transmission is very desirable especially the tendency of the weight to decrease the capacity of the clutch upon acceleration. By way of example, it will be noted that upon acceleration of the vehicle after a stop at a traffic light, weight 81 will swing counterclockwise because of its inertia, and cause the transmission to tend to assume the intermediate gear ratio and to remain in that gear during the time of acceleration.

A manual control rod 50 may be used if desired for varying the capacity of the high speed clutch which is preferably connected to the upper end 60 of the yoke member by a slotted connection 70. The manual control may be used either to prevent movement of the pendulum or to force the weights 52 to their inner position, whereby the intermediate gear will be engaged.

If it should be desired to reverse the direction of the vehicle, gear 49 is moved to its extreme right position whereby teeth 91 and teeth 92 are moved out of engagement and gear 49 is meshed with idler gear 48, whereby the reverse drive may be taken through gears 22, 17, 21, 48, and 49. It will be noted that by reason of the step-up gear train used to drive the intermediate gear weights 24, they may be made of smaller size and still have sufficient force to engage the intermediate clutch 23. Because of the high speed at which weights 24 are rotated, it is preferred to use a centrifugal clutch including the shoes 33 which will be disengaged at high vehicle speeds and will prevent the weights 24 from being driven at an excessively high speed.

While a preferred embodiment of the invention has been illustrated and described, it is understood that this showing and description are illustrative only and that the invention is not regarded as limited to the form shown and described, or otherwise, except by the terms of the following claims:

What is claimed is:

1. In an automatic transmission mechanism for a vehicle, a driving shaft, a driven shaft, means for automatically connecting the shafts in a pair of gear ratios, and operatively connected with the automatic means and means responsive to the force of gravity for controlling the automatic means to modify the gear changes in accordance with variation in an upward inclination of the forward ends of the shafts with respect to a horizontal plane, said gravity responsive means being mounted on a non-rotative part of the mechanism and arranged to be normally stationary with respect to the vehicle.

2. In an automatic transmission mechanism for a vehicle, a driving shaft, a driven shaft, means for automatically connecting the shafts in a pair of gear ratios, and a pivoted pendulous weight operatively connected with the automatic means and arranged to control the automatic means and vary the tendency to gear change in accordance with variations in the upward inclination of the front end of the shafts with respect to a horizontal plane, said gravity responsive means being mounted on a non-rotative part of the mechanism and arranged to be normally stationary with respect to the vehicle.

3. In an automatic variable speed transmission mechanism for a road vehicle, a driving shaft, a driven shaft, a friction clutch responsive to driven shaft load for connecting the shafts in a high speed ratio, gear means for connecting the shafts in a low speed ratio when the clutch is disengaged, and gravity controlled means operatively connected with the clutch for varying the effect of the driven shaft load on the clutch when the vehicle is ascending a hill, said gravity responsive means being mounted on a non-rotative part of the mechanism and arranged to be normally stationary with respect to the vehicle.

4. In an automatic variable speed transmission mechanism for a road vehicle, a driving shaft, a driven shaft, a friction clutch responsive to driven shaft load for connecting the shafts in a high speed ratio, gear means for connecting the shafts in a low speed ratio when the clutch is disengaged, and gravity controlled means operatively connected with the clutch for decreasing the capacity of the clutch when the vehicle is ascending a hill, said gravity responsive means being mounted on a non-rotative part of the mechanism and arranged to be normally stationary with respect to the vehicle.

5. In an automatic variable speed transmission mechanism for a road vehicle, a driving shaft, a driven shaft, a friction clutch responsive to driven shaft load for connecting the shafts in a high speed ratio, gear means for connecting the shafts in a low speed ratio when the clutch is disengaged, and a pendulum pivotally mounted adjacent the clutch and operatively connected therewith to normally hang at right angles to the shafts and arranged to reduce the frictional capacity of the clutch when the vehicle is ascending a hill, said gravity responsive means being mounted on a non-rotative part of the mechanism and arranged to be normally stationary with respect to the vehicle.

6. In an automatic variable speed transmission mechanism for a road vehicle, a driving shaft, a driven shaft, a friction clutch for connecting the shafts in a high speed ratio, means for connecting the shafts in a low speed ratio when the clutch is disengaged, centrifugal weights for controlling the action of the clutch, and gravity actuated means for controlling the weights.

7. In an automatic variable speed transmission mechanism for a road vehicle, a driving shaft, a driven shaft, a friction clutch for connecting the shafts in a high speed ratio, means for connecting the shafts in a low speed ratio when the clutch is disengaged, centrifugal weights for controlling the action of the clutch, and means responsive to inclination of the vehicle for overcoming outward force of the weights when the vehicle is ascending a hill.

8. In an automatic variable speed transmission mechanism for a road vehicle, a driving shaft, a driven shaft, a friction clutch for connecting the shafts in a high speed ratio, means for connecting the shafts in a low speed ratio when the clutch is disengaged, centrifugal weights for controlling the action of the clutch, and a pendulum normally positioned at right angles to the shafts arranged to overcome centrifugal force of the weights when the vehicle is ascending a hill.

9. In an automatic variable speed transmission mechanism, a driving shaft, a driven shaft, means for automatically connecting the shafts in a high gear ratio, means for automatically connecting the shafts in a low gear ratio, and means for connecting the shafts in an intermediate gear ratio including a friction clutch responsive to both driven shaft speed and load.

10. In an automatic variable speed transmission mechanism, a driving shaft, a driven shaft, means for automatically connecting the shafts in a high gear ratio, means for automatically connecting the shafts in a low gear ratio, means for connecting the shafts in an intermediate gear ratio including a friction clutch responsive to both the load and speed of the driven shaft, and means responsive to inclination of the vehicle for controlling the high speed gear connecting means.

11. In an automatic variable speed transmission mechanism, a driving shaft, a driven shaft, a clutch responsive to driven shaft load for connecting the shafts in a high speed ratio, means for connecting the shafts in an intermediate speed ratio including a clutch responsive to driven shaft speed, and means including an overrunning clutch for connecting the shafts in a low speed ratio.

12. In an automatic variable speed transmission mechanism, a driving shaft, a driven shaft, a clutch responsive to driven shaft load for connecting the shafts in a high speed ratio, means for connecting the shafts in an intermediate speed ratio including a clutch responsive to driven shaft speed, means for connecting the shafts in a low speed ratio, and means for modifying the action of the high speed clutch in accordance with the upward inclination of the front ends of the shafts with respect to a horizontal plane.

13. In an automatic variable speed transmission mechanism, a driving shaft, a driven shaft, a clutch responsive to driven shaft load for connecting the shafts in a high speed ratio, means for connecting the shafts in an intermediate speed ratio including a clutch responsive to driven shaft speed, means for connecting the shafts in a low speed ratio, and means for disengaging the intermediate speed clutch at high driven shaft speeds.

14. In an automatic variable speed transmission mechanism for a vehicle, a driving shaft, a driven shaft in alignment therewith, a counter shaft, means including a friction clutch responsive to driven shaft load for directly connecting the shafts, gears on the counter shaft for connecting the other shafts around the clutch when the first clutch is released, one of said gears being rotatable on the counter shaft, and a second friction clutch responsive to driven shaft speed for connecting said gear to the counter shaft.

15. In an automatic variable speed transmission mechanism for a vehicle, a driving shaft, a driven shaft in alignment therewith, a counter shaft, means including a friction clutch responsive to driven shaft load for directly connecting the shafts, gears on the counter shaft for connecting the other shafts around the clutch when the first clutch is released, one of said gears being rotatable on the counter shaft, a second friction clutch responsive to driven shaft speed for connecting said gear to the counter shaft, and means for declutching said gear as the driven shaft speed is increased beyond a predetermined maximum.

16. In an automatic variable speed transmission mechanism for a vehicle, a driving shaft, a driven shaft in alignment therewith, a counter shaft, means including a friction clutch responsive to driven shaft load for directly connecting the shafts, gears on the counter shaft for connecting the other shafts around the clutch when the first clutch is released, one of said gears being rotatable on the counter shaft, a second friction clutch responsive to driven shaft speed for connecting said gear to the counter shaft, and gravity controlled means for varying the capacity of the direct connecting clutch.

17. In an automatic variable speed transmission mechanism for a vehicle, a driving shaft, a driven shaft in alignment therewith, a counter shaft, means including a friction clutch responsive to driven shaft load for directly connecting the shafts, gears on the counter shaft for connecting the other shafts around the clutch when the first clutch is released, one of said gears being rotatable on the counter shaft, a second friction clutch responsive to driven shaft speed for connecting said gear to the counter shaft, and a pendulum arranged to increase the capacity of the direct connecting clutch.

18. In an automatic variable speed transmission mechanism for a vehicle, a driving shaft, a driven shaft aligned therewith, a speed responsive clutch for directly connecting the shafts, a counter shaft, a pair of meshed gears connecting the driving shaft and counter shaft on one side of the clutch, a second pair of meshed gears adapted to connect the driven shaft and counter shaft on the other side of the clutch, one of said second pair of gears being rotatable on the counter shaft, a clutch including centrifugal weights rotated by the driven shaft for connecting the gear to the counter shaft, a third pair of gears connecting the counter shaft to the driven shaft, and means responsive to load on the third pair of gears opposing outward movement of the weights.

19. In an automatic variable speed transmission mechanism for a vehicle, a driving shaft, a driven shaft aligned therewith, a speed responsive clutch for directly connecting the shafts, a counter shaft, a pair of meshed gears connecting the driving shaft and counter shaft on one side of the clutch, a second pair of meshed gears adapted to connect the driven shaft and counter shaft on the other side of the clutch, one of said second pair of gears being rotatable on the counter shaft, a clutch including centrifugal weights rotated by the driven shaft for connecting the gear to the counter shaft, a third pair of gears connecting the counter shaft to the driven shaft, means responsive to load on the third pair of gears opposing outward movement of the weights, and means for controlling rotation of the weights at high driven shaft speeds.

20. In an automatic variable speed transmission mechanism for a road vehicle, a driving shaft, a driven shaft, a friction clutch for connecting the shafts in a high speed ratio, means for connecting the shafts in a low speed ratio when the clutch is disengaged, centrifugal weights for controlling the action of the clutch, a pendulum pivoted on a fixed part of the transmission and operatively connected with the weights for controlling the weights, and manually operable means for controlling the pendulum.

21. In a vehicle, a driving shaft, a driven shaft, a variable torque capacity clutch for connecting the shafts, centrifugal means for controlling the clutch, gravity actuated means associated with the centrifugal means, said gravity means being movable to control the weights and vary the torque capacity of the clutch in accordance with the upward inclination of the vehicle, and manually operable means for controlling the gravity actuated means.

22. In an automatic variable speed transmission mechanism for a road vehicle, a driving shaft, a driven shaft, a friction clutch responsive to driven shaft load for connecting the shafts in a high speed ratio having a tendency to disengage at increased loads, gear means for connecting the shafts in a low speed ratio when the clutch is disengaged, and inertia means associated with the clutch for decreasing the capacity of the clutch upon acceleration of the vehicle whereby the same is disengaged at a reduced shaft load.

23. In an automatic variable speed transmission mechanism for a road vehicle, a driving shaft, a driven shaft, a friction clutch responsive to driven shaft load for connecting the shafts in a high speed ratio having a tendency to disengage at increased loads, gear means for connecting the shafts in a low speed ratio when the clutch is disengaged, inertia means associated with the clutch for varying the capacity of the clutch in accordance with acceleration of the vehicle whereby the same is disengaged at a reduced shaft load, and manually operated means for controlling the inertia means.

24. In an automatic transmission mechanism for a vehicle, a driving shaft, a driven shaft, means for automatically connecting the shafts in a plurality of gear ratios, gravity controlled means being operatively connected with the means for automatically connecting the shafts said gravity means being arranged to increase the tendency to change to a lower gear ratio when the vehicle is ascending a hill, and said gravity controlled means being responsive to inclination of the vehicle.

CLINTON H. HAVILL.
ALBERT S. WALTON.